(12) United States Patent
Noh et al.

(10) Patent No.: US 6,811,929 B2
(45) Date of Patent: Nov. 2, 2004

(54) POLYMERIC GEL ELECTROLYTE, LITHIUM BATTERY USING THE SAME, AND METHODS OF MANUFACTURING THE ELECTROLYTE AND THE LITHIUM BATTERY

(75) Inventors: Ilyeong-gon Noh, Geoul (KR); Ki-ho Kim, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 261 days.

(21) Appl. No.: 10/001,994

(22) Filed: Dec. 5, 2001

(65) Prior Publication Data

US 2002/0090555 A1 Jul. 11, 2002

(30) Foreign Application Priority Data

Jan. 5, 2001 (KR) .............................................. 2001-669

(51) Int. Cl.[7] ............................ H01M 6/14; H01M 6/18
(52) U.S. Cl. ...................... 429/322; 429/303; 429/317
(58) Field of Search ............................... 429/303, 314, 429/317, 321, 322; 29/623.1

(56) References Cited

U.S. PATENT DOCUMENTS

| | | | | |
|---|---|---|---|---|
| 5,597,659 A | * | 1/1997 | Morigaki et al. | 429/303 |
| 5,641,565 A | * | 6/1997 | Sogo | 428/315.7 |
| 5,952,126 A | | 9/1999 | Lee et al. | 429/314 |
| 6,114,068 A | * | 9/2000 | Yamada et al. | 429/300 |
| 6,159,389 A | * | 12/2000 | Miura et al. | 252/62.2 |
| 6,180,287 B1 | * | 1/2001 | Watanabe et al. | 429/312 |
| 6,632,571 B2 | * | 10/2003 | Noh | 429/303 |

FOREIGN PATENT DOCUMENTS

| | | | | |
|---|---|---|---|---|
| EP | 838487 A2 | * | 4/1998 | .......... C08G/65/08 |
| JP | 11039940 A | * | 2/1999 | ............ H01B/1/12 |

* cited by examiner

Primary Examiner—Gregg Cantelmo
(74) Attorney, Agent, or Firm—Staas & Halsey LLP (57) ABSTRACT

A lithium battery having a cathode, an anode, and a separator interposed between the cathode and the anode, wherein the separator is an insulating resin sheet having a network structure in which a polymeric gel electrolyte is contained. The polymer electrolyte is prepared by polymerizing a polymer electrolyte precursor having a polymer represented by formula 1, a crosslinking agent represented by formula 2, and an electrolyte solution composed of a lithium salt and a non-aqueous organic solvents. Formula 1 is as follows:

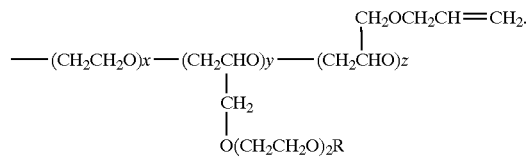

Formula 2 is as follows:

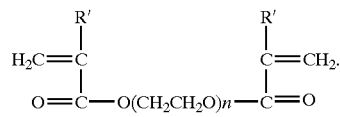

In formula 1 and formula 2, x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

24 Claims, 3 Drawing Sheets

POLYMERIC GEL ELECTROLYTE, LITHIUM BATTERY USING THE SAME, AND METHODS OF MANUFACTURING THE ELECTROLYTE AND THE LITHIUM BATTERY

CROSS-REFERENCE TO RELATED APPLICATIONS

This application claims the benefit of Korean Application No. 2001-669, filed Jan. 5, 2001, in the Korean Industrial Property Office, the disclosure of which is incorporated herein by reference.

BACKGROUND OF THE INVENTION

1. Field of the Invention

The present invention relates to a polymeric gel electrolyte and a lithium battery using the same, and more particularly, to a polymeric gel electrolyte formed by polymerization used in a battery, a method of manufacturing the polymeric gel electrolyte, a lithium battery having improved high-rate charging/discharging characteristics using a separator containing the polymeric gel electrolyte, and a method of manufacturing the lithium battery.

2. Description of the Related Art

Conventional lithium secondary batteries use electrolytes, such as liquid electrolytes or solid electrolytes, and in particular, polymeric electrolytes. Since a lithium secondary battery using a polymeric electrolyte is unlikely to damage equipment due to leakage of an electrolyte solution and the electrolyte itself serves as a separator, the polymeric electrolyte allows for miniaturization of the battery and realizing a high energy density battery. Owing to such advantages, much attention has been paid to lithium secondary batteries using polymeric electrolytes that can be used, for example, in operating power sources such as those used in portable electronic devices and computer memory backups.

An example of a lithium secondary battery using the polymer electrolyte as the separator is described, for example, in U.S. Pat. No. 5,952,126. In this battery, a polymeric electrolyte comprises a polymer matrix composed of a copolymer of N-isopropylacryl amide and polyethyleneglycol dimethacrylate and an electrolyte solution. The polymer matrix and the electrolyte solution are made into a film that is interposed between a cathode and an anode. The composition which forms the polymer matrix can also include polyethylene glycol and/or dimethacrylate, which are added during the manufacture of the electrodes.

However, the above-described lithium secondary battery is difficult to manufacture. Also, due to a low content of the electrolyte solution, the ion conductivity between the cathode and the anode deteriorates, which adversely affects the battery performance. More specifically, the battery has a poor capacity in view of the high-rate charging/discharging characteristics.

SUMMARY OF THE INVENTION

It is an object of the present invention to both provide a polymeric gel electrolyte having excellent mechanical strength and improved ion conductivity between electrodes with an increased amount of an electrolyte solution, and a method of manufacturing the polymeric gel electrolyte.

It is an additional object of the present invention to both provide a lithium battery having improved high-rate charging/discharging characteristics by using the polymeric gel electrolyte, and a method of manufacturing the lithium battery.

Additional objects and advantages of the invention will be set forth in part in the description which follows and, in part, will be obvious from the description, or may be learned by practice of the invention.

To achieve the above and other objects, a polymeric gel electrolyte polymeric gel electrolyte prepared by polymerizing a polymer electrolyte precursor according to an embodiment of the present invention includes a polymer represented by formula 1, a crosslinking agent represented by formula 2, and an electrolyte solution composed of a lithium salt and a non-aqueous organic solvent, where:

Formula 1

Formula 2 x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

According to another embodiment of the present invention, a method of manufacturing a polymeric gel electrolyte includes preparing a polymer electrolyte precursor by mixing a polymer represented by formula 1, a crosslinking agent represented by formula 2, and an electrolyte solution composed of a lithium salt and a non-aqueous organic solvent, where:

Formula 1

Formula 2 x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$; and polymerizing the polymer electrolyte precursor.

According to a further embodiment of the present invention, a lithium battery includes a cathode, an anode, and a separator interposed between the cathode and the anode, wherein the separator is an insulating resin sheet having a network structure to contain a polymeric gel electrolyte, the polymer electrolyte being prepared by polymerizing a polymer electrolyte precursor comprising a polymer represented by formula 1, a crosslinking agent represented by formula 2, and an electrolyte solution composed of a lithium salt and a non-aqueous organic solvent, where:

x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

According to yet another embodiment of the present invention, a method of manufacturing a lithium battery includes inserting an insulating resin sheet having a network structure between a cathode and an anode to form an electrode assembly and accommodating the electrode assembly into a battery case, injecting a polymer electrolyte precursor comprising a polymer represented by formula 1, a crosslinking agent represented by formula 2, and an electrolyte solution composed of a lithium salt and a non-aqueous organic solvent, into the battery case having the electrode assembly to impregnate the polymer electrolyte precursor into the insulating resin sheet having the network structure, where:

x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$, and polymerizing the resultant of the injected polymer electrolyte precursor to form the polymeric gel electrolyte.

According to an aspect of the invention, the polymer represented by formula 1 has a weight-average molecular weight of 5,000 to 2,000,000 and a content thereof is 2 to 10 parts by weight based on 100 parts by weight of the polymer electrolyte precursor.

According to another aspect of the invention, the crosslinking agent represented by formula 2 has a weight-average molecular weight of 258 to 500,000, and a content thereof is 0.01 to 50 parts by weight based on 100 parts by weight of the polymer electrolyte precursor.

According to still another aspect of the invention, the polymer electrolyte precursor further includes as an additional crosslinking agent 0.01 to 50 parts by weight of N,N-(1,4-phenylene)bismaleimide, based on 100 parts by weight of the polymer electrolyte precursor.

According to yet still another aspect of the invention, the non-aqueous organic solvent is at least one selected from the group consisting of propylene carbonate, ethylene carbonate, dimethylcarbonate, methylethylcarbonate, diethylcarbonate and vinylene carbonate, and the lithium salt is at least one selected from the group consisting of $LiClO_4$, $LiBF_4$, $LiPF_6$, $LiCF_3SO_3$, and $LiN(CF_3SO_2)_2$.

According to a further aspect of the invention, the content of the electrolyte solution is in the range of 40 to 98 parts by weight based on 100 parts by weight of the polymer electrolyte precursor.

According to a still further aspect of the invention, the insulating resin sheet is one of a polyethylene resin, a polypropylene resin or a combination thereof, has a porosity of 40 to 80%, and has a thickness in the range of 10 to 30 μm.

According to a yet further aspect of the invention, in preparing the polymer electrolyte and lithium battery, the polymerization temperature is in the range of 60° C. to 100° C.

BRIEF DESCRIPTION OF THE DRAWINGS

The above and other objects and advantages of the present invention will become more apparent and more readily appreciated by describing in detail embodiments thereof with reference to the accompanying drawings in which.

DESCRIPTION OF THE PREFERRED EMBODIMENTS

Reference will now be made in detail to the present preferred embodiments of the present invention, which are illustrated in the accompanying drawings and discussed in specific examples, wherein like reference numerals refer to like elements throughout. The embodiments are described below in order to explain the present invention by referring to the figures and examples.

Figure 3:
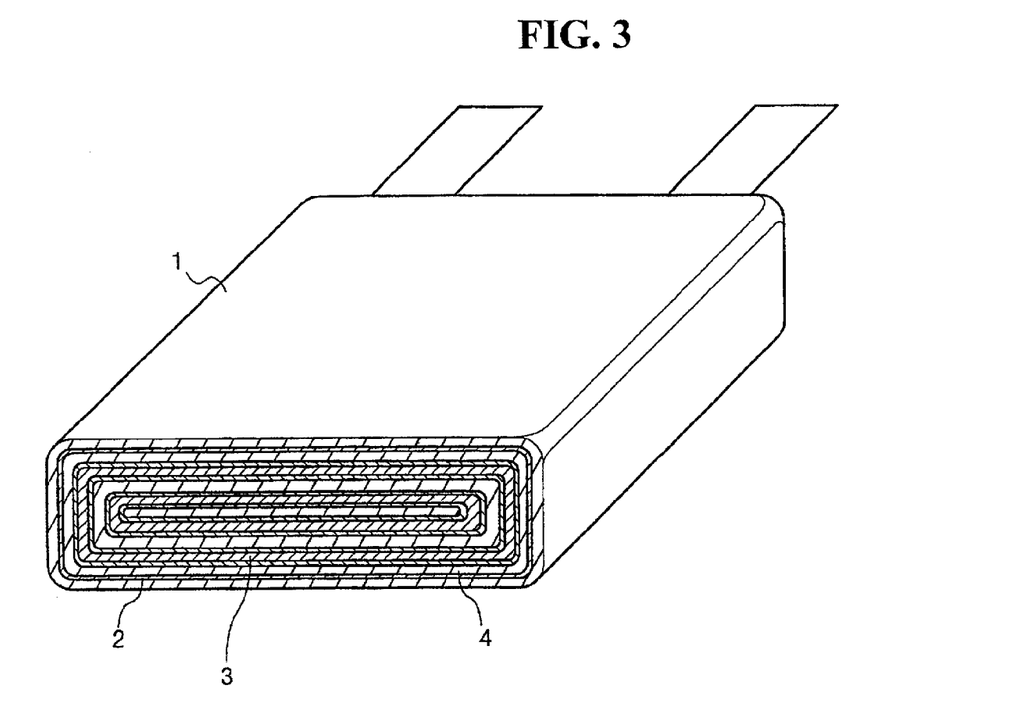
FIG. 3 shows a lithium-sulfur battery according to an embodiment of the present invention.

As shown in FIG. 3, a lithium-polymer battery according to an embodiment of the present invention includes a case 1 containing a positive electrode (i.e., a cathode) 3, a negative electrode (i.e., an anode) 4, and a separator 2 interposed between the positive electrode 3 and the negative electrode 4. According to embodiments of the present invention, a polymeric gel electrolyte is used as a separator 2, or an insulating resin sheet having a network structure and a sheet containing the polymeric gel electrolyte in the matrix is used. However, the use of the insulating resin sheet has certain advantages. Since the polymer electrolyte exists in the form of gel in the network structure of the sheet, the leakage of an electrolyte solution does not occur. Also, the degree of freedom in ion mobility is greater than when using a pure solid electrolyte, and ion conductance between a cathode and an anode is facilitated. However, it is understood that polymeric gel electrolyte need not be used with the resin sheet in all aspects of the invention.

The insulating resin sheet serves as a support for the polymer electrolyte and maintains the strength of the separator 2. Examples of such insulating resin sheets include, but are not limited to, polyethylene resin, a polypropylene resin, or combinations thereof. A thickness of the insulating resin sheet is in the range of 10 to 30 μm and a porosity is preferably 40 to 80% according to an embodiment of the invention.

If the thickness of the insulating resin sheet is greater than 30 μm, the battery performance may deteriorate. If the thickness of the insulating resin sheet is less than 10 μm, fine shorting may occur. If the porosity is greater than 80%, the battery performance may deteriorate. If the porosity is less than 40%, the manufacture of a separator 2 is quite difficult to achieve, which is undesirable. However, it is understood that other combinations of porosities and thicknesses can be used or developed.

The polymer electrolyte contained in the network structure of the insulating resin sheet is prepared by polymerizing a polymer electrolyte precursor comprising a polymer represented by formula 1, a crosslinking agent represented by formula 2, and a polymer electrolyte precursor consisting of a lithium salt and a non-aqueous organic solvent or a polymeric electrolyte precursor added with N,N-(1,4-phenylene)bismaleimide as a crosslinking agent. Formula 1 and formula 2 are as follows:

Formula 1

Formula 2

In formula 1 and formula 2, x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

Detailed examples of R represented by formula 1 include a methyl group, an ethyl group and the like. Detailed examples of the crosslinking agent represented by formula 2 include polyethylene glycol dimethacrylate, polyethylene glycol diacrylate and the like.

A polymerization temperature of the polymer electrolyte precursor is 60° C. to 100° C. according to an embodiment of the invention. If the polymerization temperature is higher than 100° C., the electrolyte solution undesirably evaporates. If the polymerization temperature is lower than 60° C., the crosslinking reaction between the polymer represented by formula 1 and the crosslinking agent represented by formula 2 is not carried out. However, it is understood that other temperatures can be used.

The process of preparing a lithium battery using a polymeric gel electrolyte according to an embodiment of the present invention will now be described in detail.

A cathode 3 and an anode 4 are obtained or are manufactured by a general method of manufacturing a lithium battery, respectively. A lithium metal composite oxide or a sulfur compound is used as a cathode active material, and a lithium metal, a carbon material, or graphite is used as an anode active material. However, it is understood that other cathodes 3 and anodes 4 can also be used.

An insulating resin sheet having a network structure is interposed between the obtained cathode 3 and anode 4. The insulating resin sheet is wound or stacked, thereby forming an electrode assembly.

The formed electrode assembly is accommodated in an electrode case 1. A polymer electrolyte precursor is injected into the electrode case having the electrode assembly so that the polymer electrolyte precursor is impregnated into the insulating resin sheet. Here, the injection of the polymer electrolyte precursor is advantageously performed under a decompressed condition. It is understood that the polymer precursor could impregnate the insulating resin sheet prior to being inserted into the electrode case.

The polymer electrolyte precursor is prepared by mixing a polymer represented by formula 1, a crosslinking agent represented by formula 2, and an electrolyte solution composed of a lithium salt and an organic solvent. In addition, a polymerization starter and a polymerization catalyst may be added to the polymer electrolyte precursor to facilitate a crosslinking reaction between the polymer represented by formula 1 and the crosslinking agent represented by formula 2 according to an embodiment of the invention.

Detailed examples of the polymerization starter includes azobisbutyronitrile (AIBN), which is a thermal polymerization starter, where 0.01 to 5 parts by weight of the polymerization starter is used based on 100 parts by weight of the polymer represented by formula 1. Detailed examples of the polymerization catalyst include benzoyl peroxide, where 0.01 to 10 parts by weight of the polymerization catalyst is used based on 100 parts by weight of the polymer represented by formula 1. However, other starters and catalysts can be used.

The polymer represented by formula 1 has a weight-average molecular weight of 5,000 to 2,000,000, and a content thereof is preferably 2 to 10 parts by weight based on 100 parts by weight of the polymer electrolyte precursor according to an embodiment of the invention.

The crosslinking agent represented by formula 2 has a weight-average molecular weight of 258 to 500,000, and a content thereof is preferably 0.01 to 50 parts by weight based on 100 parts by weight of the polymer electrolyte precursor according to an embodiment of the invention.

The weight-average molecular weight and the content ranges of the polymer represented by formula 1 and the crosslinking agent represented by formula 2 are decided in consideration of a viscosity of the polymer electrolyte precursor and the battery performance after the polymerization reaction. As such, other weights and contents are possible.

According to an embodiment of the invention, the non-aqueous organic solvent is at least one selected from the group consisting of propylene carbonate, ethylene carbonate, dimethylcarbonate, methylethylcarbonate, diethylcarbonate and vinylene carbonate. The lithium salt is at least one selected from the group consisting of $LiClO_4$, $LiBF_4$, $LiPF_6$, $LiCF_3SO_3$, and $LiN(CF_3SO_2)_2$. The content of the electrolyte solution composed of the lithium salt and the non-aqueous organic solvent is in the range of 40 to 98 parts by weight based on 100 parts by weight of the polymer electrolyte precursor. If the content of the electrolyte solution is greater than 98 parts by weight, the polymerization reaction does not occur. If the content of the electrolyte solution is less than 40 parts by weight, the battery performance may undesirably deteriorate. However, it is understood that other contents and weights are possible or can be developed.

In order to increase the mechanical strength of the polymer electrolyte containing sheet, N,N-(1,4-phenylene) bismaleimide is further added according to an embodiment of the invention to the polymer electrolyte precursor as an additional crosslinking agent. A content of the N,N-(1,4-phenylene)bismaleimide is in the range of 0.01 to 50 parts by weight based on the 100 parts by weight of the polymer electrolyte precursor. However, other content ranges are possible.

According to an embodiment of the invention, the electrolyte solution composed of the lithium salt and the non-aqueous organic solvent is in the range of 40 to 98 parts by weight based on 100 parts by weight of the polymer electrolyte precursor. However, it is understood that other contents and weights are possible or can be developed.

The battery case having the insulating resin sheet having the network structure in which the polymer electrolyte precursor is impregnated, is heated. Here, the heating temperatures slightly vary according to the kinds of the polymer represented by formula 1 and the crosslinking agent represented by formula 2 which is in the range of 60° C. to 100° C. according to an embodiment of the invention. If the heating temperature is higher than 100° C., the electrolyte solution evaporates. If the heating temperature is lower than 60° C., the polymerization reaction does not occur, which is undesirable. However, it is understood that other temperatures can be used or developed.

After heating the battery case, the polymer and crosslinking agent in the polymer electrolyte precursor are polymerized to form a polymeric gel electrolyte, thereby completing the polymer electrolyte containing sheet.

The lithium battery according to the present invention is not specifically limited in view of the type, and both lithium primary batteries and lithium secondary batteries can be embodied in the present invention.

The present invention will now be described through the following examples and is not limited thereto.

EXAMPLE 1

94 parts by weight of $LiCoO_2$, 3 parts by weight of Super-P, and 3 parts by weight of polyvinylidenefluoride (PVDF) were dissolved in 80 parts by weight of N-methyl-2-pyrrolidone to prepare a cathode active material slurry. The cathode active material slurry was coated on an aluminum (Al) foil having a width of 4.9 cm and a thickness of 147 $\mu$m. The coated aluminum foil was dried and pressed, and cut into a predetermined dimension to manufacture a cathode.

89.8 parts by weight of mezophase carbon fiber (MCF) (such as that manufactured by Petoca Ltd., Japan), 0.2 parts by weight of oxalic acid, 10 parts by weight of PVDF were dissolved in 120 parts by weight of N-methyl-2-pyrrolidone to prepare an anode active material slurry. The anode active material slurry was coated on a copper foil having a width of 5.1 cm and a thickness of 178 $\mu$m. The coated copper foil was dried and pressed, and cut into a predetermined dimension to manufacture an anode.

A polyethylene separator (such as that manufactured by Asahi Chemical Industry Co., Ltd.) having a width of 5.35 cm, a thickness of 18 $\mu$m, and a porosity of 60% was interposed between the cathode and the anode, and wound to form an electrode assembly. The electrode assembly was put into a battery case, decompressed, and then 5.6 g of a polymer electrolyte precursor to be described below was injected into the decompressed battery case.

The polymer electrolyte precursor was prepared by adding 3 g of a polymer represented by formula 1 having a weight-average molecular weight of 1,000,000 (such as that manufactured by Daiso Co., Ltd.) to 97 g of an electrolyte solution (such as that manufactured by Ube Industries, Ltd.) containing 1.15M $LiPF_6$ and EC:DMC:DEC in a weight ratio of 3:3:4, and dissolved. 1 g of polyethylene glycol dimethacrylate having a weight-average molecular weight of 330 was added thereto and mixed. Then, 0.5 g of AIBN was added to the mixture and homogenously mixed.

Thereafter, the resultant was placed in a constant temperature water bath maintained at 70° C. for 2 hours and heated to carry out thermal polymerization using the polymer electrolyte precursor. This process created an 18 $\mu$m thick polymer electrolyte containing sheet and a lithium secondary battery.

EXAMPLE 2

A lithium secondary battery was completed in the same manner as Example 1, except that 91 g of an electrolyte solution containing 1.15M $LiPF_6$ and EC:DMC:DEC in a mixture ratio by weight of 3:3:4 (such as that manufactured by Ube Industries, Ltd.), was used, and 6 g of polyethylene glycol dimethacrylate was used during the manufacture of the polymer electrolyte precursor.

EXAMPLE 3

A lithium secondary battery was completed in the same manner as Example 1, except that 0.1 g of N,N-(1,4-phenylene)bismaleimide was further added to the polymer electrolyte precursor.

EXAMPLE 4

A lithium secondary battery was completed in the same manner as Example 1, except that a polyethylene separator (such as that manufactured by Asahi Chemical Industry Co., Ltd.) having a width of 5.35 cm, a thickness of 18 $\mu$m and a porosity of 60% was interposed between a cathode and an anode and stacked to form the electrode assembly.

EXAMPLE 5

3 g of a polymer represented by formula 1 having a weight-average molecular weight of 1,000,000 (such as that manufactured by Daiso Co., Ltd.) was added to 97 g of an electrolyte solution (such as that manufactured by Ube Industries, Ltd.) containing 1.15M $LiPF_6$ and EC:DMC:DEC in a weight ratio of 3:3:4, and dissolved. 1 g of polyethylene glycol dimethacrylate having a weight-average molecular weight of 330 was added thereto and mixed. Then, 0.5 g of AIBN was added to the mixture and homogenously mixed to manufacture the polymer electrolyte precursor. The polymer electrolyte precursor was cast on a support film, dried, and heated to 70° C. Then, the resultant was peeled from the support film, thereby completing a polymeric gel electrolyte.

EXAMPLE 6

A polymeric gel electrolyte was completed in the same manner as Example 1, except that 91 g of an electrolyte solution containing 1.15M $LiPF_6$ and EC:DMC:DEC in a mixture ratio by weight of 3:3:4 (such as that manufactured by Ube Industries, Ltd.), and 6 g of polyethylene glycol methacrylate were used during the manufacture of the polymer electrolyte precursor.

EXAMPLE 7

A polymeric gel electrolyte was completed in the same manner as Example 1, except that 0.1 g of N,N-(1,4-phenylene)bismaleimide was further added to the polymer electrolyte precursor.

The ion conductivity and mechanical strength of polymeric gel electrolytes prepared by Examples 5 through 7 were evaluated. The evaluation tests showed that the ion conductivities of the polymeric gel electrolytes prepared in Examples 5–7 were excellent (i.e., approximately 0.0001 to 0.001 S/cm), and the mechanical strengths thereof were also excellent indicating good manageability.

Figure 1:
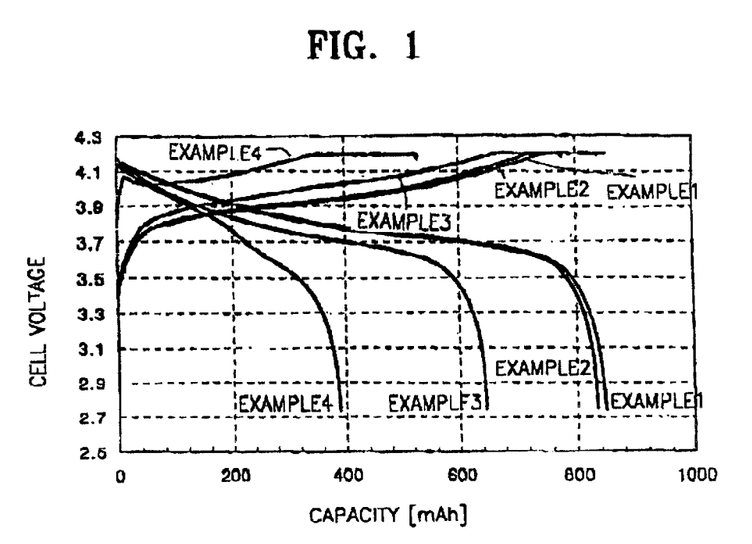
FIG. 1 is a graph showing the standard charge/discharge cycle characteristics of lithium secondary batteries manufactured by Examples 1 through 4 according to embodiments of the present invention.
Figure 2:
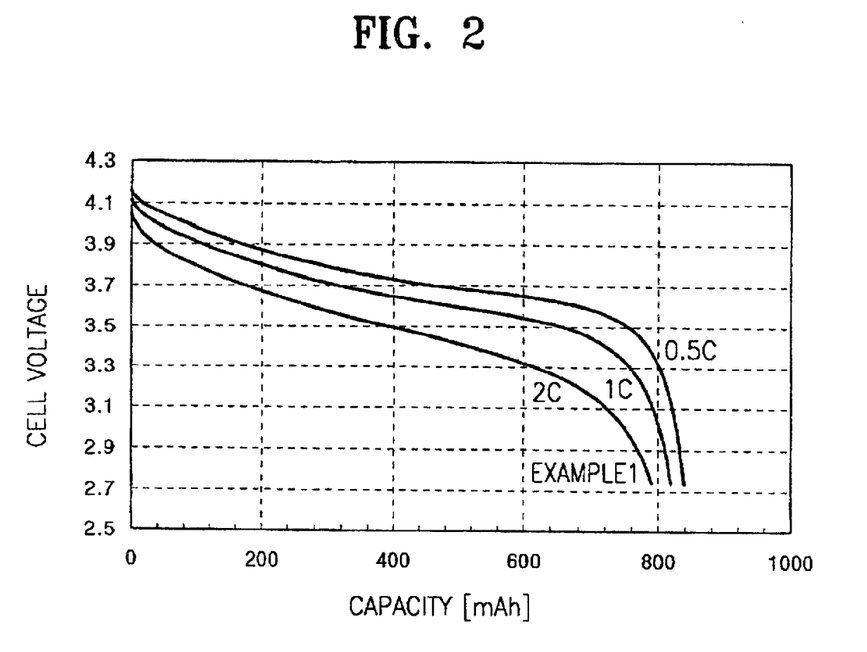
FIG. 2 is a graph showing the discharge-performance-by-rate of a lithium secondary battery manufactured by Example 1 according to an embodiment of the present invention.

FIG. 1 shows the standard charge/discharge cycle characteristics of the lithium secondary batteries manufactured by Examples 1 through 4 of the present invention, and FIG. 2 shows the discharge-performance-by-rate of a lithium secondary battery manufactured by Example 1 of the present invention. Here, charging conditions are as follows. First, charging was allowed to proceed up to 4.2V by a constant-current method at 0.2 C and remained for 2.5 hours at the constant voltage of 4.2V. Then, discharging was allowed to proceed and cut off at 2.75 V.

Referring to FIG. 1, it is confirmed that the standard charge/discharge cycle characteristics of the lithium secondary batteries manufactured by Examples 1 through 4 are excellent. Referring to FIG. 2, the lithium secondary battery manufactured by Example 1 maintains excellent discharge performance at an intermediate rate of 1 C, a low rate of 0.5 C, and a high rate of 2 C.

A lithium battery according to the present invention has reduced resistance at an interface between an electrode and an electrolyte and improved ion conductance between electrodes by using a polymeric gel electrolyte as a separator. The polymeric gel electrolyte is formed by crosslinking a polymer represented by formula 1and a crosslinking agent represented by formula 2 in a network structure of an insulating resin sheet for electron insulation and has improved high-rate charge/discharge characteristics.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A polymeric gel electrolyte prepared by polymerizing a polymer electrolyte precursor comprising:
   a polymer represented by formula 1;
   a crosslinking agent represented by formula 2; and
   an electrolyte solution composed of a lithium salt and a non-aqueous organic solvent,
   wherein formula 1 is as follows formula 2 is as follows x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

2. The polymeric gel electrolyte according to claim 1, wherein said polymer has a weight-average molecular weight of 5,000 to 2,000,000, and has a content of 2 to 10 parts by weight based on 100 parts by weight of the polymer electrolyte precursor.

3. The polymeric gel electrolyte according to claim 1, wherein said crosslinking agent represented by formula 2 has a weight-average molecular weight of 258 to 500,000, and a content thereof is 0.01 to 50 parts by weight based on 100 parts by weight of the polymer electrolyte precursor.

4. The polymeric gel electrolyte according to claim 1, further comprising an additional crosslinking agent, said additional crosslinking agent having a content of 0.01 to 50 parts by weight of N,N-(1,4-phenylene)bismaleimide, based on 100 parts by weight of the polymer electrolyte precursor.

5. The polymeric gel electrolyte according to claim 1, wherein the non-aqueous organic solvent is at least one selected from the group consisting of propylene carbonate, ethylene carbonate, dimethylcarbonate, methylethylcarbonate, diethylcarbonate and vinylene carbonate, and the lithium salt is at least one selected from the group consisting of $LiClO_4$, $LiBF_4$, $LiPF_6$, $LiCF_3SO_3$, and $LiN(CF_3SO_2)_2$.

6. The polymeric gel electrolyte according to claim 1, wherein a content of said electrolyte solution is in the range of 40 to 98 parts by weight based on 100 parts by weight of the polymer electrolyte precursor.

7. A method of manufacturing a polymeric gel electrolyte comprising:
   preparing a polymer electrolyte precursor by mixing a polymer represented by formula 1, a crosslinking agent represented by formula 2, and an electrolyte solution composed of a lithium salt and a non-aqueous organic solvent, wherein formula 1 is as follows formula 2 is as follows x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$; and polymerizing the prepared polymer electrolyte precursor.

8. The method according to claim 7, wherein said preparing the polymer electrolyte precursor further includes adding as an additional crosslinking agent 0.01 to 50 parts by weight of N,N-(1,4-phenylene)bismaleimide, based on 100 parts by weight of the polymer electrolyte precursor.

9. The method according to claim 7, wherein said polymerization of the prepared polymer electrolyte precursor is performed at 60 to 100° C.

10. The method according to claim 7, further comprising impregnating the polymer electrolyte precursor in an insulating resin sheet, and said polymerizing the prepared polymer electrolyte precursor comprises polymerizing the impregnated polymer electrolyte precursor.

11. The method according to claim 7, further comprising spreading the polymer electrolyte precursor on a support film, wherein said polymerizing the prepared polymer electrolyte precursor comprises polymerizing the spread polymer electrolyte precursor, and peeling the resulting polymerized polymer gel electrolyte from the support film.

12. The method according to claim 7, wherein said preparing the polymer electrolyte precursor further comprises adding a polymerization starter and a polymerization catalyst to facilitate a crosslinking reaction between the polymer and the crosslinking agent.

13. A lithium battery comprising:
   a cathode;
   an anode; and
   a separator interposed between said cathode and said anode, wherein said separator comprises an insulating resin sheet having a network structure in which a polymeric gel electrolyte is contained, the polymer gel electrolyte being prepared by polymerizing a polymer electrolyte precursor comprising a polymer represented by formula 1, a crosslinking agent represented by formula 2, and an electrolyte solution composed of a lithium salt and a non-aqueous organic solvent, wherein formula 1 is as follows formula 2 is as follows x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

14. The lithium battery according to claim 13, wherein the polymer represented by formula 1 has a weight-average molecular weight of 5,000 to 2,000,000, and has a content of 2 to 10 parts by weight based on 100 parts by weight of the polymer electrolyte precursor.

15. The lithium battery according to claim 13, wherein the crosslinking agent represented by formula 2 has a weight-average molecular weight of 258 to 500,000, and has a content of 0.01 to 50 parts by weight based on 100 parts by weight of the polymer electrolyte precursor.

16. The lithium battery according to claim 13, wherein the polymer electrolyte precursor further includes as an additional crosslinking agent 0.01 to 50 parts by weight of N,N-(1,4-phenylene)bismaleimide, based on 100 parts by weight of the polymer electrolyte precursor.

17. The lithium battery according to claim 13, wherein the non-aqueous organic solvent is at least one selected from the group consisting of propylene carbonate, ethylene carbonate, dimethylcarbonate, methylethylcarbonate, diethylcarbonate and vinylene carbonate, and the lithium salt is at least one selected from the group consisting of $LiClO_4$, $LiBF_4$, $LiPF_6$, $LiCF_3SO_3$, and $LiN(CF_3SO_2)_2$.

18. The lithium battery according to claim 13, wherein a content of electrolyte solution is in the range of 40 to 98 parts by weight based on 100 parts by weight of the polymer electrolyte precursor.

19. The lithium battery according to claim 13, wherein the insulating resin sheet comprises one of a polyethylene resin, a polypropylene resin and a combination thereof, and has a porosity thereof is 40 to 80% and a thickness in the range of 10 to 30 μm.

20. A method of manufacturing a lithium battery comprising:

inserting an insulating resin sheet having a network structure between a cathode and an anode to form an electrode assembly;

accommodating the electrode assembly in a battery case;

injecting a polymer electrolyte precursor comprising a polymer represented by formula 1, a crosslinking agent represented by formula 2, and an electrolyte solution composed of a lithium salt and a non-aqueous organic solvent, into the battery case having the electrode assembly to impregnate a polymer electrolyte precursor into the insulating resin sheet having the network structures, wherein formula 1 is as follows formula 2 is as follows x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$; and polymerizing the resultant obtained by said injecting the polymer electrolyte precursor to form a polymeric gel electrolyte.

21. The method according to claim 20, wherein the polymer electrolyte precursor further includes as an additional crosslinking agent 0.01 to 50 parts by weight of N,N-(1,4-phenylene)bismaleimide, based on 100 parts by weight of the polymer electrolyte precursor.

22. The method according to claim 20, wherein said polymerization of the resultant is performed at 60 to 100° C.

23. A lithium battery comprising:

a cathode:

an anode; and a polymeric gel electrolyte disposed between said cathode and said anode, wherein said polymer gel electrolyte is prepared by polymerizing a polymer electrolyte precursor comprising a polymer represented by formula 1, a crosslinking agent represented by formula 2, and an electrolyte solution composed of a lithium salt and a non-aqueous organic solvent, wherein formula 1 is as follows formula 2 is as follows x ranges from 0.1 to 0.6 mol, y ranges from 0.1 to 0.8 mol, z ranges from 0.1 to 0.8 mol, R is an alkyl having 1 to 6 carbon atoms, n is an integer from 3 to 30, and R' is hydrogen or $CH_3$.

24. The lithium battery of claim 23, further comprising an insulating resin sheet having a network structure in which said polymeric gel electrolyte is contained, said insulating resin sheet being disposed between said anode and said cathode.

* * * * *

UNITED STATES PATENT AND TRADEMARK OFFICE
CERTIFICATE OF CORRECTION

PATENT NO.    : 6,811,929 B2
DATED         : November 2, 2004
INVENTOR(S)   : Hyeong-gon Noh et al.

It is certified that error appears in the above-identified patent and that said Letters Patent is hereby corrected as shown below:

<u>Title page,</u>
Item [75], Inventors, first inventor, change "Ilyeong-gon Noh, Geoul (KR)" to
-- Hyeong-gon Noh, Seoul (KR) --.

Signed and Sealed this

Third Day of May, 2005

JON W. DUDAS
*Director of the United States Patent and Trademark Office*